United States Patent [19]

Akeley

[11] Patent Number: 5,193,145

[45] Date of Patent: Mar. 9, 1993

[54] METHOD AND APPARATUS FOR PRODUCING A VISUALLY IMPROVED IMAGE IN A COMPUTER SYSTEM

[75] Inventor: Kurt Akeley, Mountain View, Calif.

[73] Assignee: Silicon Graphics, Inc., Mountain View, Calif.

[21] Appl. No.: 851,264

[22] Filed: Mar. 13, 1992

Related U.S. Application Data

[63] Continuation of Ser. No. 480,729, Feb. 16, 1990, abandoned.

[51] Int. Cl.$^5$ .............................................. G06F 15/72
[52] U.S. Cl. ..................................... 395/123; 395/126
[58] Field of Search ....................... 395/123, 126, 120; 340/729, 723, 747

[56] References Cited

U.S. PATENT DOCUMENTS

| | | | |
|---|---|---|---|
| 4,625,289 | 11/1986 | Rockwood | 364/522 |
| 4,819,192 | 4/1989 | Kuragano et al. | 364/522 |
| 4,855,938 | 8/1989 | Gonzalez-Lopez et al. | 395/123 X |
| 4,912,659 | 3/1990 | Liang | 364/521 |
| 4,912,664 | 3/1990 | Weiss et al. | 395/123 X |
| 4,930,092 | 5/1990 | Reilly | 395/123 |
| 4,933,889 | 6/1990 | Meshkat et al. | 364/522 X |
| 4,985,854 | 1/1991 | Wittenburg | 364/522 |

OTHER PUBLICATIONS

*Calculus with Analytic Geometry*, E. J. Purcell, Meredith Publishing Co., 1965, pp. 474-479.

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

A method and apparatus for producing a visually improved image on a video display in a computer controlled display system. The system and method converts a quadrilateral polygon to a pair of triangles by computing the dot product of the normal unit vectors of one set of opposing pair of vectices and computing the dot product of the normal unit vectors of the other set of opposing pair of vertices and then comparing these two dot products to determine which opposing pair of vertices produces the larger of the two dot products. The pair of opposing vertices which produces the largest dot product is used to form the common edge of the pair of triangles into which the quadrilateral is converted.

12 Claims, 4 Drawing Sheets

METHOD AND APPARATUS FOR PRODUCING A VISUALLY IMPROVED IMAGE IN A COMPUTER SYSTEM

This is a continuation of application Ser. No. 07/480,729, filed Feb. 16, 1990, now abandoned.

BACKGROUND OF THE INVENTION

1. Field of the Invention

The present invention relates to an apparatus and method for displaying images on a video display. Specifically, the present invention relates to an apparatus and method for generating visually improved images on a video display where the image is generated at least in part from a collection of triangular graphics primitives.

2. Prior Art

Many computer systems today are capable of displaying complex 3-dimensional curves and solids display devices which are controlled by these computer systems. For example, complex 3-dimensional solids and curves may be displayed on video displays which are controlled by computer systems, and these computer systems often allow the user of the system to manipulate (e.g., rotate, scale, etc.) the object which is displayed. These computer systems often use well known graphics techniques for redering these 3-D curves and solids, such as hidden surface algorithms (sometimes referred to as Z buffering) and Gouraud shading as well as other classic computer graphics techniques such as clipping the displayed object so that it appears through a window. See, e.g., Newman and Sproull, *Principles of Interactive Computer Graphics*, 2nd Edition, McGraw-Hill, 1979; and Foley and Van Dam, *Fundamentals of Interactive Computer Graphics*, Addision-Wesley, 1982.

These various graphics techniques may be implemented on general purpose computers as well as computers that have specialized graphics engines which are typically hardware/software combinations designed to handle and manipulate image data which is used to render objects for viewing. These specialized graphics engines typically attempt to reduce a complex 3-D curve or solid to a certain type of polygon (often referred to as a fundamental graphic primitive) which the system is designed to manipulate. General purpose computers that have no specialized graphics engines will typically have commercially available software which can render 3-D curves and solids on a general purpose computer machine, and this software often will attempt to break down complex 3-D curves and solids into smaller polygons of a certain variety (i.e., a graphic primitive) in order to render these complex objects to thereby display them. As is well known in the art, these graphics primitives attempt to approximate the complex 3-dimensional surface which the computer user seeks to display. Typically, a plurality of graphics primitives is used to portray the object, although these primitives usually only approximate the surface. See, for example, Foley and Van Dam, supra, page 582 (picture of a Volkswagen Beetle).

Often, these computer systems utilize triangles as the fundamental area primitive, and accordingly complex 3-dimensional curves and solids are typically broken down into a plurality of triangles which are then processed further using well known graphics techniques (e.g., hidden surface algorithm, clipping, filling polygons, Gouraud shading, projection to the coordinate system of the viewer, etc.) to complete the generation of the image on a display device which is controlled by the computer system. The plurality of triangles approximates the complex surface. In these systems which utilize the triangle as the fundamental area primitive, there is often a need to decompose a quadrilateral into two (or more) triangles.

In the past, quadrilaterals have been decomposed by either connecting vertices 0 and 2 (which are a pair of opposing vertices in the quadrilateral) or vertices 1 and 3 (which is the other pair of opposing vertices of the quadrilateral) to thereby form two triangles. That is, the system is designed to always select one pair of opposing vertices. Alternatively, one may randomly pick one of the two pairs of opposing vertices and connect those vertices to form two triangles within the quadrilateral.

These prior art techniques for decomposing the quadrilateral do not consistently yield good results which are visually pleasing to the viewer. For example, if the selection of opposing vertices is incorrectly made, shading quality suffers substantially as compared to a computer system which simply renders the quadrilateral with Gouraud shading with no decomposition of that quadrilateral into triangles. Of course, if the selection fortuitously is made correctly, shading of surfaces will be substantially improved over computer systems which do not attempt to decompose the quadrilateral into triangles.

It is an object of this invention to provide an improve method and apparatus for producing a visually improved image by consistently decomposing quadrilaterals to a pair of triangles so that the resulting image is visually improved over the prior art techniques.

SUMMARY OF THE INVENTION

The method of the present invention provides a visually improved image on a video display in a computer controlled video display system by converting a quadrilateral polygon in 3-dimensional space to a pair of triangles so that the resulting pair of triangles may be displayed in a manner which is more graphically and visually pleasing to the user. The quadrilateral polygon will have a normal unit vector for each of the four vertices of the quadrilateral. These normal unit vectors are the normal unit vectors of the actual 3-dimensional surface that is approximated by the quadrilateral. Two of these vertices will form a first pair of opposing vertices and the other two of the vertices will form a second pair of opposing vertices. In the method of the invention, the dot product of the normal unit vector of the first opposing pair of vertices is computed along with the dot product of the normal unit vector of the second opposing pair of vertices. These dot products are then compared to determine which of the two dot products is larger. This will determine which opposing pair of vertices produces the larger of the two dot products. The quadrilateral is then decomposed by converting the quadrilateral into a pair of triangles by connecting the vertices of the opposing pair of vertices which produces the larger of the two dot products.

In the apparatus of the invention, the computer system includes a video display for displaying an image where the image is typically generated at least in part from a collection of triangular primitives which will typically include at least the two triangles generated from the decomposition of a quadrilateral which is detected in the image data during the process of reducing a complex 3-dimension curve/solid into a plurality of triangles and perhaps other polygons. The apparatus of the invention includes means for computing the dot product of the normal unit vectors of a first opposing pair of vertices and further includes means for computing the dot product of the normal unit vectors of the second opposing pair of vertices. The apparatus of the invention also includes a means for comparing the dot product of the normal unit vectors of the first opposing pair of vertices to the dot product of the normal unit vectors of the second opposing pair of vertices to determine which opposing pair of vertices produces the larger of the two dot products. The apparatus of the invention further includes means for converting the quadrilateral polygon to a pair of triangles by forming a connection between the opposing pair of vertices which produces the larger of the two dot products. This connection of two vertices results in the addition of edge information indicating that 2 additional edges have been added to the image data in order to create two triangles from the quadrilateral. These 2 additional edges are actually the same common edge shared by the pair of triangles into which the quadrilateral was converted.

These and other aspects of the invention will be discussed with reference to the following figures.

DESCRIPTION OF THE DRAWINGS

FIG. 2b shows the angle ($\theta_1$) between the normal unit vector NV1 and the normal unit vector NV3 shown in FIG. 2a; FIG. 2b also shows the angle between the normal unit vectors NV2 and NV4 shown in FIG. 2a.

DESCRIPTION OF THE PREFERRED EMBODIMENT

The present invention relates to a method and an apparatus for converting a quadrilateral present in image data into two triangles to thereby improve the visual appearance of images which are represented by the image data. The following detailed description describes the present invention with reference to figures which show examples of the invention. The processes of the present invention are not inherently limited to any particular computer, although they may be more advantageously utilized in a computer system having specialized graphics hardware and graphics software (e.g., graphics software packages, such as those described generally in Newman and Sproull, *Principles of Interactive Computer Graphics*, pages 79-89 and 333-346, McGraw-Hill, 1979). Consequently, it will be appreciated by those of ordinary skill in the computer art that many different computer systems may be employed with the present invention.

Figure 1:
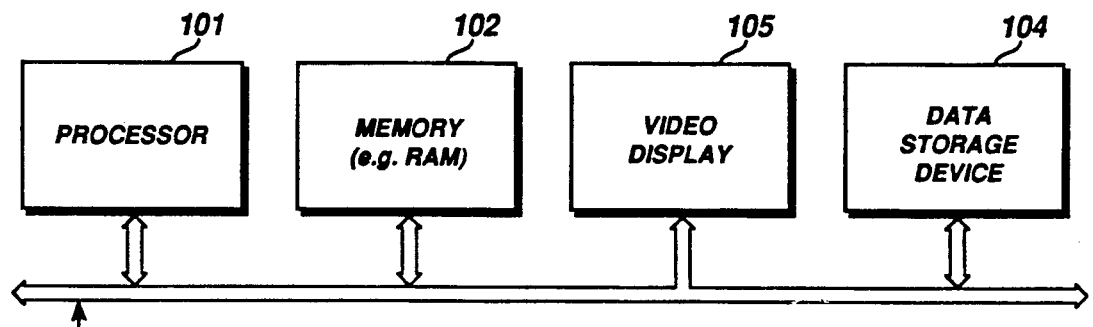
FIG. 1 is a generalized architectural diagram of a typical computer system which may be utilized with the present invention.

In general, such computer systems, as illustrated in FIG. 1, comprise a bus 100 for communicating information, a processor 101 coupled with said bus 100 for processing information, a memory 102 such as a random access memory (RAM) 102 coupled with said bus 100 for storing information and instructions for said processor 101, a data storage device 104, such as a magnetic disk and disk drive coupled with said bus 100 for storing information and instructions, and a display 105 coupled to said bus 100 for displaying information to the computer user. The display device 105 may be any of many possible output devices, including cathode ray tubes (CRT) liquid crystal displays, etc.; the display device 105 is typically a video display which has a CRT or other suitable raster scan display device.

Alternative computer systems utilizing specialized graphics engines (specialized hardware and software) are well known in the art. These systems typically modify the system shown in FIG. 1 by incorporating a specialized video subsystem which includes a video processor and video RAM as well as a video display; this combination replaces the video display 105 shown in FIG. 1. Numerous computers from Silicon Graphics, Inc. of Mountain View, California exemplify these alternative and commercially available computer systems with specialized graphics engines. Other such systems are well known, see, for example, Foley and Van Dam, *Fundamentals of Interactive Computer Graphics*, pages 418-428. In these systems, image data from a main processor or elsewhere (e.g., data storage device 104) is in the form of graphic output primitives such as lines, points, polygons or character strings. Often, a triangle is used as the fundamental graphic output primitive; in this circumstance, a quadrilateral which is present in the image data may be converted into two triangles in order for the graphics subsystem to be able to handle the quadrilateral.

Figure 5:
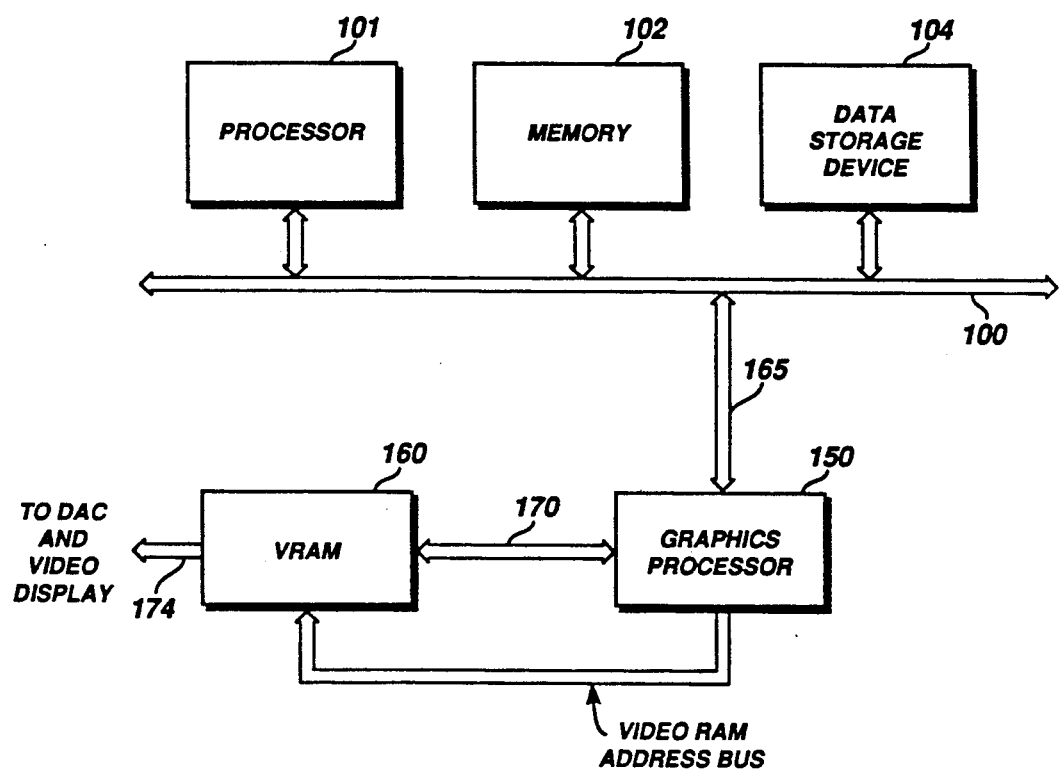
FIG. 5 shows an alternative computer system having a graphics subsystem.

FIG. 5 shows an example of a computer system having a graphics subsystem. The graphics processor 150 receives image data from the processor 101 (which represents a similar processor to the processor shown in FIG. 1) over the bus 100 and the bus 165. The graphics processor 150 receives image data which is typically in the form of graphic primitives in triangular form and perhaps some quadrilateral polygons. The graphics processor 150 uses that image data to create an image which is rendered by using well known graphics techniques such as clipping, coloring, rendering 3-dimensional curved surfaces and solids, Gouraud shading and hidden surface algorithms. The resulting image is stored in video RAM 160 (which typically includes the well known frame buffer) by the graphics processor 150 addressing the video RAM 160 over the video RAM address bus while supplying video data over bus 170 into the video RAM 160. The output of video RAM 160 is coupled through bus 174 to a digital-to-analog converter (DAC) and then to a video display device.

Figure 2A:
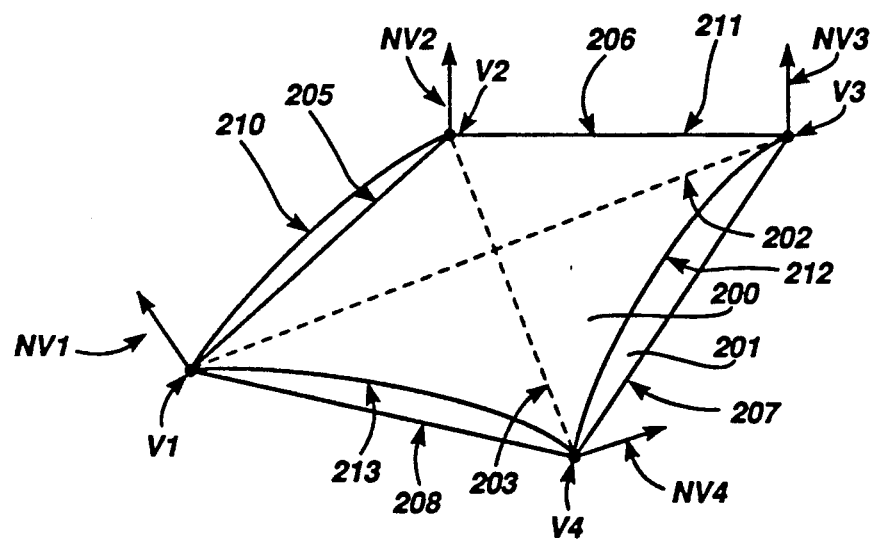
FIG. 2a is a generalized depiction of a curved surface 200 and the quadrilateral that approximates that surface.
Figure 3:
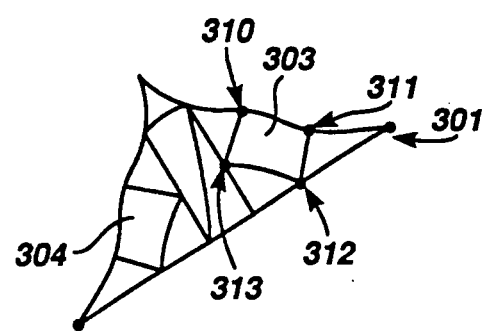
FIG. 3 shows a representation of a modern jet fighter which has been reduced to a plurality of triangles except for quadrilaterals 303 and 304.

A generalized quadrilateral 201, which is a 3-dimensional surface, is shown in FIG. 2a; this quadrilateral 201 has four vertices which are an ordered set of vertices V1, V2, V3 and V4. The quadrilateral 201 approximates the curved surface 200 of the object which is to be displayed. This use of polygons to approximate a curved surface is well known in the computer art. As shown in FIG. 2a, the quadrilateral 201 shares the same four vertices as the surface 200 even though the edges 210, 212 and 213 of the surface 200 do not coincide with the edges 205, 207 and 208 of the quadrilateral 201. It can be seen that edge 211 of the surface does coincide with the edge 206 of the quadrilateral 201. Vertex V1 is connected to vertex V2 by edge 205 of the quadrilateral. Vertex V2 is connected to vertex V3 by edge 206 of the quadrilateral. Vertex V3 is connected to vertex V4 by edge 207 of the quadrilateral. Vertex V4 is connected to vertex V1 by edge 208. Each vertex has a corresponding normal unit vector. The normal unit vector is typically determined for the actual curved surface itself rather than the approximation of that surface, which is the quadrilateral. For example, vertex V1 has the normal unit vector NV1, as shown in FIG. 2a. The normal unit vector NV2 is the normal unit vector of the vertex V2, and similarly the normal unit vector NV3 is the normal unit vector of the vertex V3. Vertexes V1 and V3 comprise a first opposing pair of vertices, and vertexes V2 and V4 form the other opposing pair of vertices. The method and apparatus of the present invention select between dashed line 202 and dashed line 203 by computing the dot product of the normal unit vectors of the first opposing pair of vertices (V1 and V2) and then comparing that dot product to the dot product of the normal unit vectors of the other opposing pair of vertices (V2 and V4). The generalized quadrilateral 201 is representative of any quadrilateral which may be found in image data. FIG. 3 shows an example of image data specified in the form of polygons, where all polygons are triangular except for the quadrilaterals 303 and 304.

Figure 4:
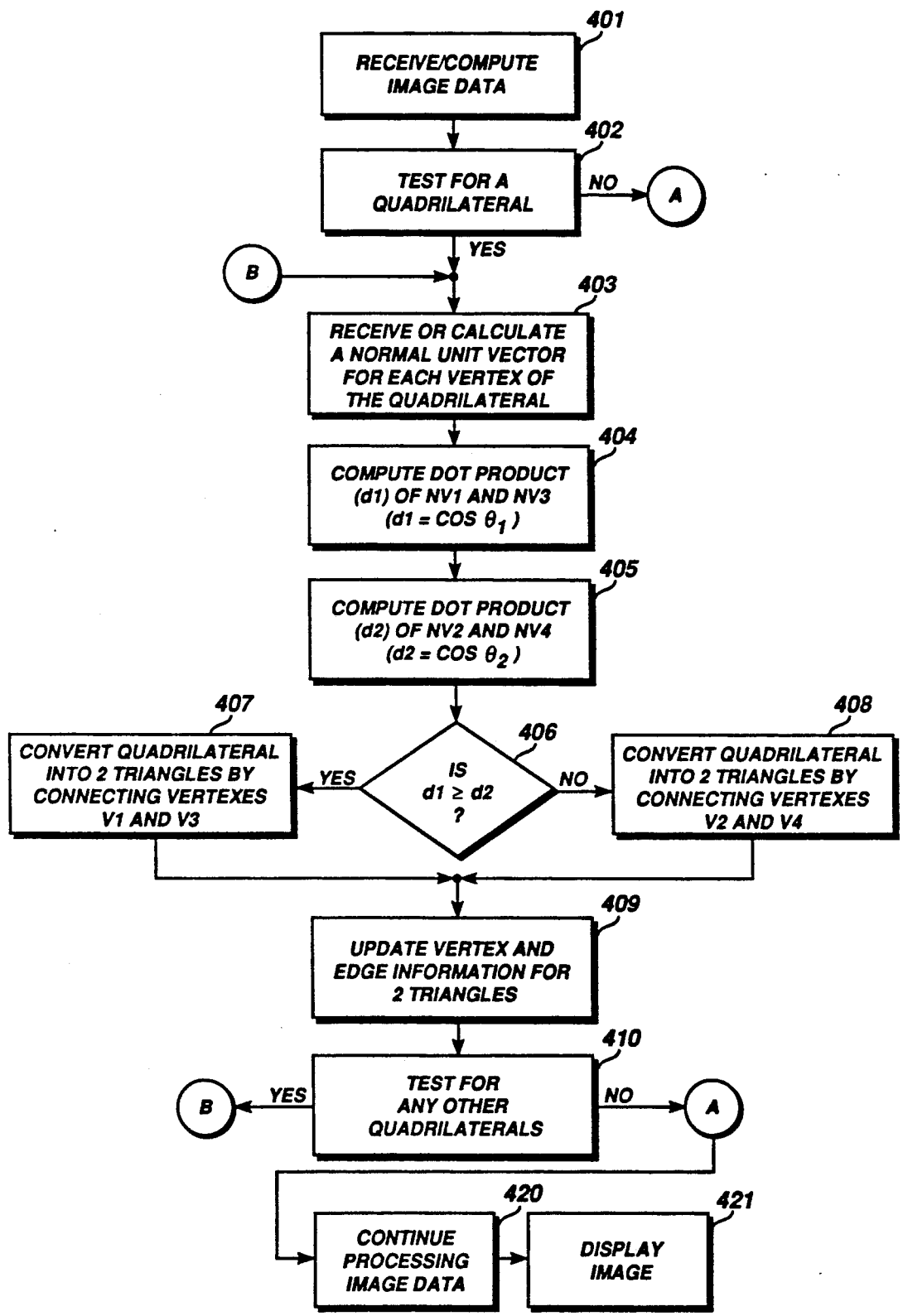
FIG. 4 shows a detailed flow diagram of the method of the present invention.

FIG. 4 will now be referred to in order to further describe the method and apparatus of the invention. The method shown in FIG. 4 uses the generalized quadrilateral 201 as an example of the process of the present invention. In step 401, image data is typically received (e.g., from a data storage device) or computed using well known graphics techniques in the prior art. As is well known in the art, the image data will typically include a set of information representing all polygons or other graphics primitives in the image; this information typically includes, for each graphic primitive and/or polygon, the coordinates of all vertices, the color of the vertices, edge information identifying each edge relative to the vertices, the normal unit vectors of each vertex and the normal unit vector of the surface of the graphic primitive/polygon. This image data is next tested for a quadrilateral in step 402. Typically, this step is performed by examining the number of vertexes for each polygon in the image data. Any polygon having four vertexes will produce the "yes" result leading to the next step, 403. If no quadrilateral is present in the image data then processing continues to node A and onto step 420, resulting in the display of the image in step 421.

In step 403, the normal unit vector for each vertex of the quadrilateral is received or calculated. Typically, this information will have already been calculated as a result of rendering various polygons to produce the image data. Alternatively, these normal unit vectors may be calculated using well known techniques in the prior art; see, for example, Newman and Sproull, supra, page 399; and Foley and Van Dam, supra, page 583.

Figure 2B:
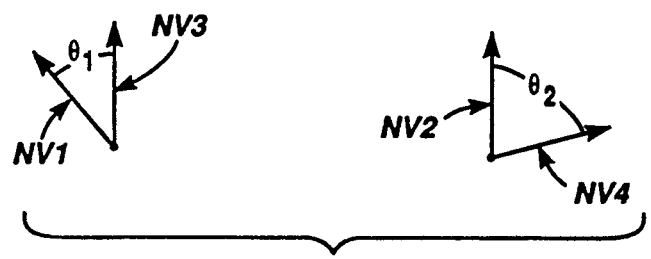

After receiving or calculating the normal unit vector for each vertex of the quadrilateral, the method and apparatus of the invention proceeds to step 404 to compute the first dot product which is illustratively shown as dot product "d1" of the normal unit vectors NV1 and NV3. As is well known, the dot product of two unit vectors is merely the cosine of the angle between those two vectors. FIG. 2b schematically represents that angle ("$\theta_1$"). In step 405 the other dot product ("d2") is computed for the other opposing pair of vertices, in this case vertices NV2 and NV4.

In step 406, the dot products computed in steps 405 and 404 are compared to determine which of the two dot products is larger. Step 406 as shown in FIG. 4 tests whether d1 is greater than or equal to d2; this test inherently includes a test for and resolution of a "tie" between d1 and d2. If d1 is larger than (or equal to) d2 then processing proceeds to step 407 where the quadrilateral is converted into two triangles by connecting the vertices V1 and V3. If on the other hand, d2 is larger than d1, then the quadrilateral is converted into two triangles by connecting the vertices V2 and V4 as shown in step 408. Following step 407 or 408 is step 409 in which vertex and edge information for the two triangles is updated in the image data. In this step, the information concerning the quadrilateral in the image data is replaced with information concerning the vertices and edges of the two triangles formed by the conversion of the quadrilateral into two triangles. In other words, the image data is updated so that the data present for the quadrilateral is replaced by data for two triangles having a common edge formed by the connection between the two vertices which were selected in step 406. Following step 409, the process continues in step 410 by testing for any other quadrilaterals which are in the image data. If there are any other quadrilaterals, processing proceeds to node B which returns back to step 403. If there are no other quadrilaterals remaining in the image data, processing proceeds to node A and then to step 420 in which well known prior art graphics techniques (e.g., clipping, polygon filling, etc.) may be applied in processing the image data. Finally, in step 421, the image is displayed on a display device such as a video display. It will be appreciated that this invention may be used in several different, well known computer coordinate systems including the coordinate system that the object is described in, or the coordinate system that all objects are represented together in (sometimes referred to as the 'world coordinate system'), or the coordinate system of the viewer.

The apparatus of the present invention may utilize standard processing components in conjunction with computer programming to implement the means for computing the dot products and the means for comparing the dot products and the means for converting the quadrilaterals into triangles. It will be apparent to those in the art that by proper programming of instructions for processor 101 or graphics processor 150 may provide the various means for detecting, computing, comparing, and converting of the quadrilateral into two triangles.

While the present invention has been particularly described with reference to FIGS. 1-5, and with emphasis on certain computer systems, it should be understood that the figures are for illustration only and should not be taken as limitations upon the invention. The present invention may be used in computer systems even if there is no requirement that quadrilaterals be reduced to triangular primitives; for example, the invention may be used to improve the display of images containing quadrilaterals in general purpose computers having no fundamental graphics primitives. It is clear that the methods and apparatus of the present invention may be modified and changed in accordance with the uses desired from the present invention. It is contemplated that many changes and modifications may be made by one of ordinary skill in the art without departing from the spirit and scope of the invention as disclosed above.

I claim:

1. A method for providing a visually improved image on a video display in a computer controlled video display system, wherein said image is generated at least in part from a collection of triangular primitives, said method including a process for converting a quadrilateral polygon in 3-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said process comprising the steps of:

computing a first dot product of the normal unit vectors of said first pair of opposing vertices and computing a second dot product of the normal unit vectors of said second pair of opposing vertices;

determining which pair of opposing vertices will be connected to thereby form two triangles, said step of determining using said first and said second dot products in a predetermined way to determine which pair of opposing vertices will be connected;

connecting the vertices of the pair of opposing vertices which were determined to be connected in said determining step; and displaying two regions representative of said pair of triangles on said video display.

2. A method for providing a visually improved image on a video display in a computer controlled video display system, wherein said image is generated at least in part from a collection of triangular primitives, said method including a process for converting a quadrilateral polygon in 3-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said process comprising the steps of:

computing a first dot product of the normal unit vectors of said first pair of opposing vertices and computing a second dot product of the normal unit vectors of said second pair of opposing vertices;

determining which pair of opposing vertices will be connected to thereby form two triangles from said quadrilateral polygon, said step of determining including a comparison based on said first and second dot products;

converting said quadrilateral polygon to a pair of triangles comprising a first triangle and a second triangle, said converting step connecting the vertices of the pair of opposing vertices which were determined to be connected in said determining step; and displaying said first and second triangles on said video display.

3. A method for providing a visually improved image on a video display in a computer controlled video display system, wherein said image is generated at least in part from a collection of triangular primitives, said method including a process for converting a quadrilateral polygon in 3-dimensional space to a pair of triangles, said process comprising:

detecting the presence of a quadrilateral in a set of image data for generating said image, said quadrilateral having four edges and four vertices such that a first vertex is coupled to a second vertex by a first edge, said second vertex is coupled to a third vertex by a second edge, said third vertex is coupled to a fourth vertex by a third edge and said fourth vertex is coupled to said first vertex by a fourth edge;

determining the normal unit vector associated with each of said four vertices such that said first vertex has a first normal unit vector, said second vertex has a second normal unit vector, said third vertex has a third normal unit vector, and said fourth vertex has a fourth normal unit vector;

computing a first dot product of said first normal unit vector and said third normal unit vector and computing a second dot product of said second normal unit vector and said fourth normal unit vector;

determining which pair of opposing vertices will be connected to thereby form two triangles from said quadrilateral polygon, said step of determining including a comparison based on said first and said second dot products;

converting said quadrilateral polygon to a pair of triangles comprising a first triangle and a second triangle, said converting step connecting the vertices of the pair of opposing vertices which were determined to be connected in said determining step; and displaying said pair of triangles on said video display.

4. In a computer controlled video display system having a computer and a video display for displaying an image wherein said image is generated at least in part from a collection of triangular primitives, an apparatus for providing a visually improved image on said video display by converting a quadrilateral polygon in three-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said apparatus comprising:

means for computing the dot product of the normal unit vectors of the first pair of opposing vertices;

means for computing the dot product of the normal unit vectors of the second pair of opposing vertices;

means for determining which pair of opposing vertices will be connected to thereby form two triangles from said quadrilateral polygon, said means of determining including a means for comparing said first and said second dot products;

means for converting said quadrilateral polygon to a pair of triangles, said means for converting connecting the vertices of the pair of opposing vertices which were determined to be connected by said means for determining; and means for displaying two regions representative of said pair of triangles, said means for displaying comprising said video display and a memory means for storing information representative of said pair of triangles.

5. A method for providing a visually improved image on a video display in a computer controlled video display system, wherein said image is generated at least in part from a collection of triangular primitives, said method including a process for converting a quadrilateral polygon in 3-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said process comprising the steps of:

computing the dot product of the normal unit vectors of the first opposing pair of vertices and computing the dot product of the normal unit vectors of the second opposing pair of vertices;

comparing the dot product of the normal unit vectors of the first opposing pair of vertices to the dot product of the normal unit vectors of the second opposing pair of vertices;

connecting the vertices of the opposing pair of vertices which produces the larger of the two dot products to thereby convert said quadrilateral into a pair of triangles; and displaying two regions representative of said pair of triangles on said video display.

6. A method for providing a visually improved image on a video display in a computer controlled video display system, wherein said image is generated at least in part from a collection of triangular primitives, said method including a process for converting a quadrilateral polygon in 3-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said process comprising the steps of:

computing the dot product of the normal unit vectors of the first opposing pair of vertices and computing the dot product of the normal unit vectors of the second opposing pair of vertices;

comparing the dot product of the normal unit vectors of the first opposing pair of vertices to the dot product of the normal unit vectors of the second opposing pair of vertices to determine which opposing pair of vertices produces the larger of the two dot products;

converting said quadrilateral polygon to a pair of triangles by forming a first triangle having as its three vertices the opposing pair of vertices which produces the larger of the two dot products and a first vertex of the other opposing pair of vertices and forming a second triangle having as its three vertices the opposing pair of vertices which produces the larger of the two dot products and a second vertex of the other opposing pair of vertices; and displaying said first and second triangles on said video display.

7. A method for providing a visually improved image on a video display in a computer controlled video display system, wherein said image is generated at least in part from a collection of triangular primitives, said method including a process for converting a quadrilateral polygon in 3-dimensional space to a pair of triangles, said process comprising the steps of:

detecting the presence of a quadrilateral in a set of image data for generating said image, said quadrilateral having four edges and four vertices such that a first vertex is coupled to a second vertex by a first edge, said second vertex is coupled to a third vertex by a second edge, said third vertex is coupled to a fourth vertex by a third edge and said fourth vertex is coupled to said first vertex by a fourth edge;

determining the normal unit vector associated with each of said four vertices such that said first vertex has a first normal unit vector, said second vertex has a second normal unit vector, said third vertex has a third normal unit vector, and said fourth vertex has a fourth normal unit vector;

computing a first dot product of the first normal unit vector and the third normal unit vector and computing a second dot product of the second normal unit vector and the fourth normal unit vector;

comparing said first dot product to said second dot product to determine whether said first dot product is larger than said second dot product;

converting said quadrilateral to a pair of triangles having a common edge formed by connecting either said first vertex and said third vertex or connecting said second vertex and said fourth vertex, said common edge being formed by said first vertex and said third vertex when said first dot product is larger than said second dot product, and said common edge being formed by said second vertex and said fourth vertex when said second dot product is larger than said first dot product; and displaying said pair of triangles on said video display.

8. In a computer controlled video display system having a computer and a video display for displaying an image wherein said image is generated at least in part from a collection of triangular primitives, an apparatus for providing a visually improved image on said video display by converting a quadrilateral polygon in three-dimensional space to a pair of triangles, said quadrilateral polygon having a normal unit vector associated with each of the four vertices of said quadrilateral polygon, two of said vertices forming a first pair of opposing vertices and the other two of said vertices forming a second pair of opposing vertices, said apparatus comprising:

means for computing the dot product of the normal unit vectors of the first opposing pair of vertices;

means for computing the dot product of the normal unit vectors of the second opposing pair of vertices;

means for comparing the dot product of the normal unit vectors of the first opposing pair of vertices to the dot product of the normal unit vectors of the second opposing pair of vertices to determine which opposing pair of vertices produces the larger of the two dot products;

means for converting said quadrilateral polygon to a pair of triangles by forming a first triangle having as its three vertices the opposing pair of vertices which produces the larger of the two dot products and a first vertex of the other opposing pair of vertices and forming a second triangle having as its three vertices the opposing pair of vertices which produces the larger of the two dot products and a second vertex of the other opposing pair of vertices; and computer controlled video display means for displaying two regions representative of said pair of triangles, and a computer memory means for storing information representative of said pair of triangles.

9. A method for providing a visually improved image on a computer controlled video display in a computer controlled video display system having a computer data storage device, wherein said image is generated at least in part from a collection of triangular primitives, said method comprising the steps of:

retrieving from said computer data storage device a first computer graphics data set having a plurality of quadrilateral polygons in 3-dimensional space, each quadrilateral polygon having four vertices, each of said plurality of quadrilateral polygons having a normal unit vector associated with each of said four polygon vertices, two of said vertices forming a first pair of opposing vertices and the other two of said vertices forming a second pair of opposing vertices;

converting said first computer graphics data set having said plurality of quadrilateral polygons in 3-dimensional space into a second computer graphics data set composed of a plurality of triangle pairs in 3-dimensional space by converting said plurality of quadrilateral polygons in 3-dimensional space to said plurality of triangle pairs, said step of converting said first computer graphics data set into said second computer graphics data set creating one triangle pair per quadrilateral polygon processed, for said each quadrilateral polygon processed said step of converting said first computer graphics data set into said second computer graphics data set further comprising the steps of:
  a) computing the dot product of the normal unit vectors of said first opposing pair of vertices and computing the dot product of the normal unit vectors of said second opposing pair of vertices;
  b) comparing said dot product of said normal unit vectors of said first opposing pair of vertices to said dot product of said normal unit vectors of said second opposing pair of vertices; and
  c) connecting said vertices of the opposing pair of vertices which produces the larger of said two dot products to thereby convert said quadrilateral into a triangle pair;
  d) storing said triangle pair to said computer data storage device; and retrieving said plurality of triangle pairs from said computer data storage device and displaying on said computer controlled video display said plurality of triangle pairs to create a viewable representation of said second computer graphics data set on said video display.

10. A method for providing a visually improved image on a computer controlled video display in a computer controlled video display system having a computer data storage device, wherein said image is generated at least in part from a collection of triangular primitives, said method comprising the steps of:

retrieving from said computer data storage device a first computer graphics data set having a plurality of quadrilateral polygons in 3-dimensional space, each quadrilateral polygon having four vertices, each of said plurality of quadrilateral polygons having a normal unit vector associated with each of said four polygon vertices, two of said vertices forming a first pair of opposing vertices and the other two of said vertices forming a second pair of opposing vertices;

converting said first computer graphics data set having said plurality of quadrilateral polygons in 3-dimensional space into a second computer graphics data set composed of a plurality of triangle pairs in 3-dimensional space by converting said plurality of quadrilateral polygons in 3-dimensional space into said plurality of triangle pairs, said step of converting said first computer graphics data set into said computer graphics data set creating one triangle pair per quadrilateral polygon processed, for said each quadrilateral polygon processed said step of converting said first computer graphics data set into said second computer graphics data set further comprising the steps of:
  a) computing the dot product of the normal unit vectors of said first opposing pair of vertices and computing the dot product of the normal unit vectors of said second opposing pair of vertices;
  b) comparing said dot product of said normal unit vectors of said first opposing pair of vertices to said dot product of said normal unit vectors of said second opposing pair of vertices to determine which opposing pair of vertices produces the larger of said two dot products;
  c) converting said quadrilateral polygon to a triangle pair by forming a first triangle having as its three vertices said opposing pair of vertices which produces the larger of the two dot products and a first vertex of the other opposing pair of vertices and forming a second triangle having as its three vertices said opposing pair of vertices which produces the larger of the two dot products and a second vertex of the other opposing pair of vertices; and
  d) storing said triangle pair to said computer data storage device; and retrieving said plurality of triangle pairs from said computer data storage device and displaying on said computer controlled video display said plurality of triangle pairs to create a viewable representation of said second computer graphics data set on video display.

11. A method for providing a visually improved image on a computer controlled video display in a computer controlled video display system having a computer data storage device, wherein said image is generated at least in part from a collection of triangular primitives, said method comprising the steps of:

retrieving from said computer data storage device a first computer graphics data set having a plurality of quadrilateral polygons in 3-dimensional space, each quadrilateral polygon having four vertices such that a first vertex is coupled to a second vertex by a first edge, said second vertex is coupled to a third vertex by a second edge, said third vertex is coupled to a fourth vertex by a third edge and said fourth vertex is coupled to said vertex by a fourth edge, each of said plurality of quadrilateral polygons having a normal unit vector associated with each of said four polygon vertices, two of said vertices forming a first pair of opposing vertices and the other two of said vertices forming a second pair of opposing vertices;

converting said first computer graphics data set having said plurality of quadrilateral polygons in 3-dimensional space into a second computer graphics data set composed of a plurality of triangle pairs in 3-dimensional space by converting said plurality of quadrilateral polygons in 3-dimensional space into said plurality of triangle pairs, said step of converting said first computer graphics data set into said second computer graphics data set creating one triangle pair per quadrilateral polygon processed, for said each quadrilateral polygon processed said step of converting said first computer graphics data set into said second computer graphics data set further comprising the steps of:

a) computing the dot product of the normal unit vectors of said first opposing pair of vertices to provide a first dot product and computing the dot product of the normal unit vectors of said second opposing pair of vertices to provide a second dot product;

b) comparing said dot product of said normal unit vectors of said first opposing pair of vertices to said dot product of said normal unit vectors of said second opposing pair of vertices to determine which opposing pair of vertices produces the larger of said two dot products;

c) converting said quadrilateral to a triangle pair having a common edge formed by connecting either said first vertex and said third vertex or connecting said second vertex and said fourth vertex, said common edge being formed by said first vertex and said third vertex when said first dot product is larger than said second dot product, and said common edge being formed by said second vertex and said fourth vertex when said second dot product is larger than said first dot product; and d) storing said triangle pair to said computer data storage device; and retrieving said plurality of triangle pairs from said computer data storage device and displaying on said computer controlled video display said plurality of triangle pairs to create a viewable representation of said second computer graphics data set on said video display.

12. An apparatus for providing a visually improved image on a computer controlled video display in a computer controlled display system having a computer data storage device, wherein said image is generated at least in part from a collection of triangular primitives, said apparatus comprising:

means for retrieving from said computer data storage device a first computer graphics data set having a plurality of quadrilateral polygons in 3-dimensional space, each quadrilateral polygon having four vertices, each of said plurality of quadrilateral polygons having a normal unit vector associated with each of said four polygon vertices, two of said vertices forming a first pair of opposing vertices and the other two of said vertices forming a second pair of opposing vertices;

means for converting said first computer graphics data set having said plurality of quadrilateral polygons in 3-dimensional space into a second computer graphics data set composed of a plurality of triangle pairs in 3-dimensional space by converting said plurality of quadrilateral polygons in 3-dimensional space into said plurality of triangle pairs, said means for converting said first computer graphics data set into said second computer graphics data set creating one triangle pair per quadrilateral polygon processed, said means for converting said first computer graphics data set into said second computer graphics data set further comprising:

a) means for computing the dot product of the normal unit vectors of said first opposing pair of vertices and computing the dot product of the normal unit vectors of said second opposing pair of vertices;

b) means for comparing said dot product of said normal unit vectors of said first opposing pair of vertices to said dot product of said normal unit vectors of said second opposing pair of vertices to determine which opposing pair of vertices produces the larger of said two dot products;

c) means for converting said quadrilateral polygon to a triangle pair by forming a first triangle having as its three vertices said opposing pair of vertices which produces the larger of the two dot products and a first vertex of the other opposing pair of vertices and forming a second triangle having as its three vertices said opposing pair of vertices which produces the larger of the two dot products and a second vertex of the other opposing pair of vertices; and d) computer data storage device for storing said triangle pair; and means for retrieving said plurality of triangle pairs from said computer data storage device and computer controlled video display for displaying said plurality of triangle pairs to create a viewable representation of said second computer graphics data set on said video display.

* * * * *